United States Patent
Fukuda

(10) Patent No.: US 11,522,203 B2
(45) Date of Patent: Dec. 6, 2022

(54) DRYING METHOD OF FUEL CELL AND DRYING APPARATUS OF FUEL CELL

(71) Applicant: TOYOTA JIDOSHA KABUSHIKI KAISHA, Toyota (JP)

(72) Inventor: Yukako Fukuda, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 17/029,264

(22) Filed: Sep. 23, 2020

(65) Prior Publication Data

US 2021/0143452 A1 May 13, 2021

(30) Foreign Application Priority Data

Nov. 13, 2019 (JP) ............................. JP2019-205111

(51) Int. Cl.
*H01M 8/0267* (2016.01)
*H01M 8/0247* (2016.01)

(52) U.S. Cl.
CPC ....... *H01M 8/0267* (2013.01); *H01M 8/0247* (2013.01)

(58) Field of Classification Search
None
See application file for complete search history.

(56) References Cited

U.S. PATENT DOCUMENTS

| | | | | |
|---|---|---|---|---|
| 2007/0099061 A1* | 5/2007 | Na | ...................... | H01M 8/2485 429/444 |
| 2007/0116999 A1* | 5/2007 | Kuramochi | ......... | B32B 38/1841 429/534 |
| 2010/0086810 A1 | 4/2010 | Hood et al. | | |
| 2016/0116541 A1 | 4/2016 | Usami et al. | | |
| 2020/0144654 A1* | 5/2020 | Hall | ........................ | H01M 8/02 |

FOREIGN PATENT DOCUMENTS

| | | |
|---|---|---|
| EP | 1777770 A1 | 4/2007 |
| JP | 2006210109 A | 8/2006 |
| JP | 2008251338 A | 10/2008 |
| JP | 2016085869 A | 5/2016 |
| JP | 2019066139 A | 4/2019 |
| KR | 10-2011-0081191 A | 7/2011 |
| WO | 2010/041013 A1 | 4/2010 |

* cited by examiner

*Primary Examiner* — Haroon S. Sheikh
(74) *Attorney, Agent, or Firm* — Dickinson Wright, PLLC

(57) ABSTRACT

A drying method of a fuel cell includes holding the fuel cell having separator plates exposed on the surface of the fuel cell at a predetermined angle, and blowing air to the fuel cell at an angle in a range of 5° or larger and 85° or smaller with respect to the surface of the separator plate of the fuel cell held at the predetermined angle.

6 Claims, 3 Drawing Sheets

DRYING METHOD OF FUEL CELL AND DRYING APPARATUS OF FUEL CELL

INCORPORATION BY REFERENCE

The disclosure of Japanese Patent Application No. 2019-205111 filed on Nov. 13, 2019 including the specification, drawings and abstract is incorporated herein by reference in its entirety.

BACKGROUND

1. Technical Field

The present disclosure relates to a drying method of a fuel cell and a drying apparatus of a fuel cell.

2. Description of Related Art

Japanese Unexamined Patent Application Publication No. 2016-85869 discloses that power generation inspection of a fuel cell is carried out by supplying a fuel gas, an oxidant gas, and coolant to a fuel cell stack, and a fuel cell stack is manufactured using fuel cells that have passed inspection. In a fuel cell that has completed power generation inspection, the coolant is attached to the surface, that is, the surface of a separator. When a fuel cell is shipped or offered for sale as a repair part, it is preferable to dry water on the surface of the separator. Japanese Unexamined Patent Application Publication No. 2019-66139 discloses that a work is heated and dried.

SUMMARY

However, when the fuel cell is heated and dried, it is considered that an electrolyte membrane between separators is affected by heating. In addition, there is a case where, depending on the drying method, a long period of time is taken. Therefore, there is a desire for a method for appropriately drying water in a fuel cell without affecting the power generation of the fuel cell.

A first aspect of the present disclosure relates to a drying method of a fuel cell. The drying method of a fuel cell includes holding the fuel cell having a separator plate exposed on the surface of the fuel cell at a predetermined angle, and blowing air to the fuel cell at an angle in a range of 5° or larger and 85° or smaller with respect to the surface of the separator plate of the fuel cell held at the predetermined angle. The first aspect enables the appropriate drying of water attached to the fuel cell without affecting the electrolyte membrane by blowing off the water attached to the fuel cell with the air.

In the first aspect, the predetermined angle may be an angle at which the angle formed between the surface of the separator plate and the horizontal direction is an angle other than 0°, and the fuel cell may be inclined such that a portion of the fuel cell where an air blower that blows the air to the fuel cell is present is higher than the remaining portion of the fuel cell. The first aspect enables the use of the force of gravity at the time of blowing off the water attached to the fuel cell.

In the above aspect, the predetermined angle may be an angle at which the angle formed between the surface of the separator plate and the horizontal direction is 5° or larger and 45° or smaller. With the above configuration, when the angle formed between the surface of the separator plate and the horizontal direction is 5° or larger, it is easy to use the force of gravity at the time of blowing off the water attached to the fuel cell. When the angle formed between the surface of the separator plate and the horizontal direction is 45° or smaller, it is possible to hold the fuel cell in a mounted state instead of holding the fuel cell in a sandwiched state.

In the above aspect, the angle at which the air is blown toward the fuel cell may be an angle in a range of 5° or larger and 45° or smaller with respect to the predetermined angle. With the above configuration, when the angle at which the air is blown toward the fuel cell is in a range of 5° or larger and 45° or smaller, it is possible to further facilitate the blowing-off of the water.

In the above aspect, the angle at which the air is blown toward the fuel cell may be an angle in a range of 10° or larger and 30° or smaller with respect to the predetermined angle. With the above configuration, when the angle at which the air is blown toward the fuel cell is in a range of 10° or larger and 30° or smaller, it is possible to still further facilitate the blowing-off of the water.

In the above aspect, there may be a situation where the fuel cell has an uneven coolant flow path on the surface of the separator plate that the air hits. In that situation, the air may be blown to the separator plate of the fuel cell along the coolant flow path. With the above configuration, the blowing-off of the water attached to the fuel cell along the coolant flow path is enabled.

A second aspect of the present disclosure relates to a drying apparatus of a fuel cell. The drying apparatus of a fuel cell includes a holding device configured to hold the fuel cell having a separator plate exposed on the surface of the fuel cell at a predetermined angle, and an air blower configured to blow air to the fuel cell at an angle in a range of 5° or larger and 85° or smaller with respect to the surface of the separator plate of the fuel cell held at the predetermined angle.

In the above aspect, the holding device may be configured to obliquely hold the fuel cell at an angle at which the angle formed between the surface of the separator plate and the horizontal direction is an angle other than 0° such that a portion of the fuel cell where the air blower that blows the air to the fuel cell is present is higher than the remaining portion of the fuel cell.

In the above aspect, the holding device may be configured to hold the fuel cell at an angle at which the angle formed between the surface of the separator plate and the horizontal direction is 5° or larger and 45° or smaller.

In the above aspect, the air blower may be configured to blow the air toward the fuel cell at an angle in a range of 5° or larger and 45° or smaller with respect to the predetermined angle.

In the above aspect, the air blower may be configured to blow the air toward the fuel cell at an angle in a range of 10° or larger and 30° or smaller with respect to the predetermined angle.

In the above aspect, the separator plate may have an uneven coolant flow path on the surface that the air hits. The holding device may be configured to hold the fuel cell such that the air is blown to the fuel cell along the coolant flow path.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
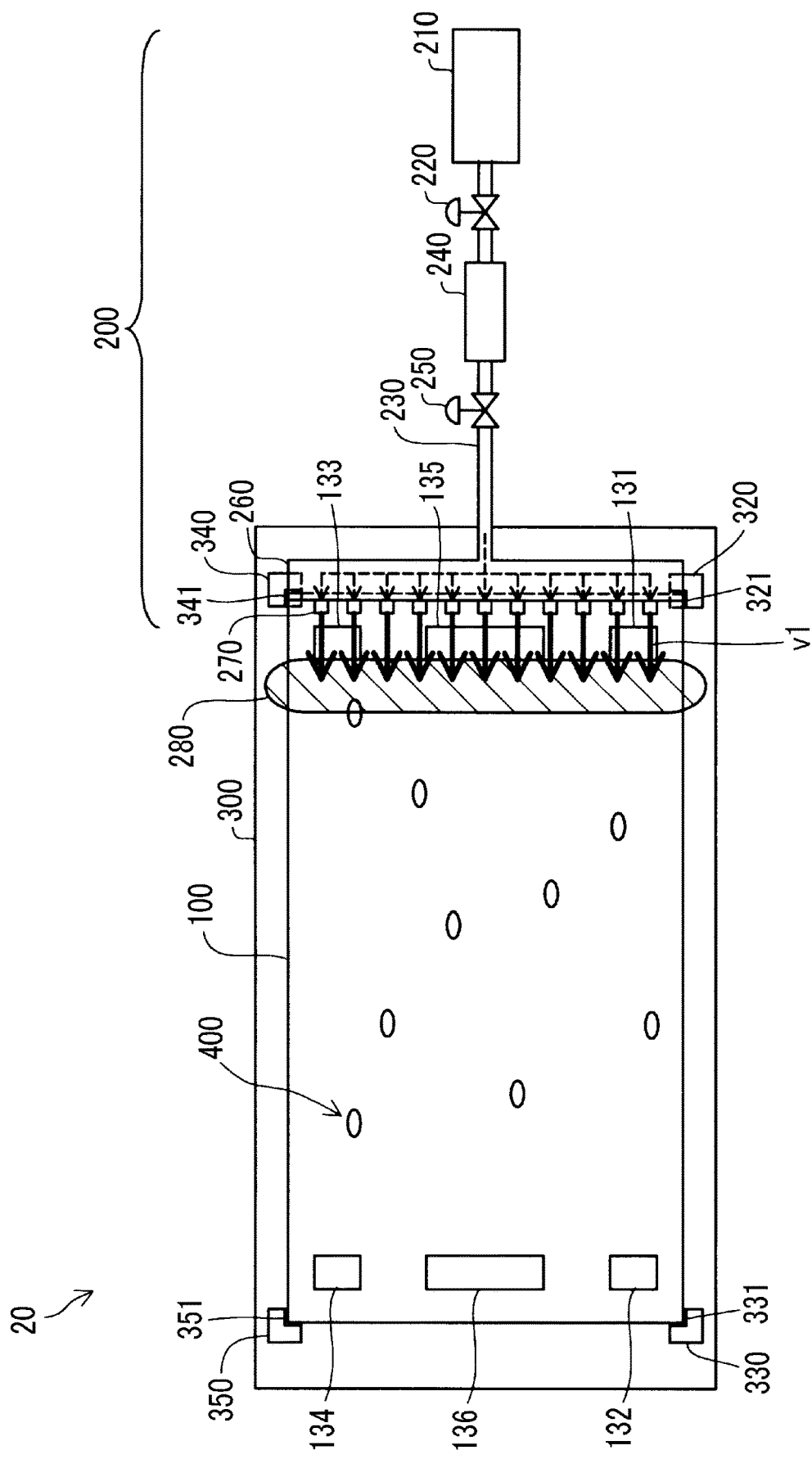
FIG. 1 is a plan view of a drying apparatus of a fuel cell in a first embodiment.
Figure 2:
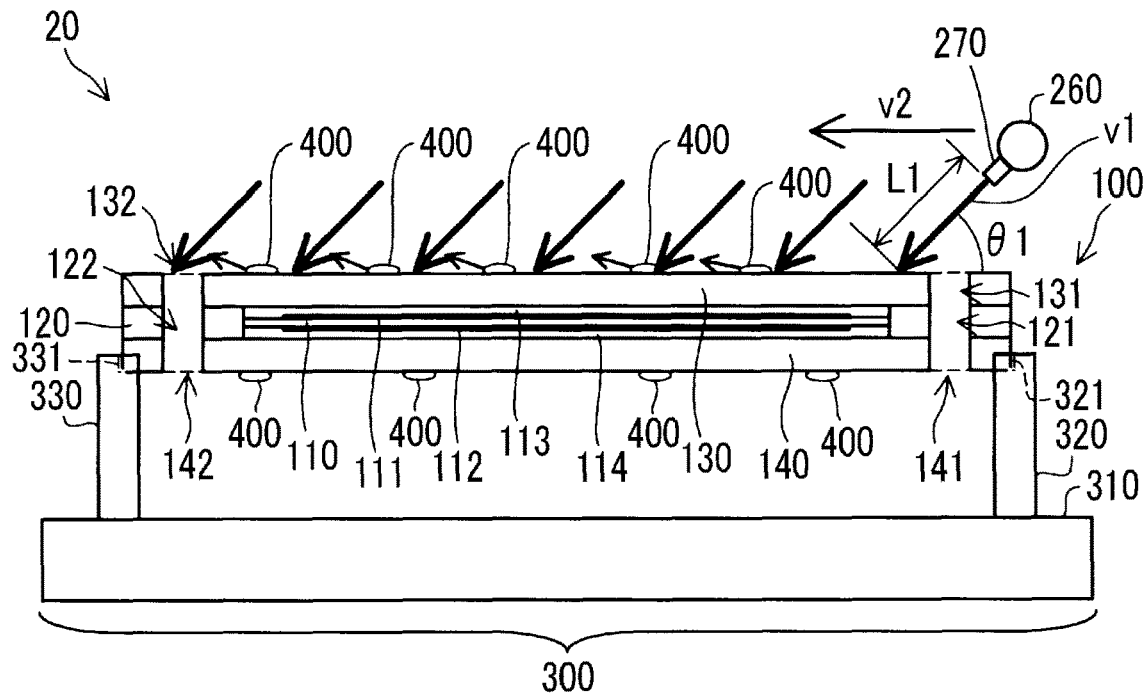
FIG. 2 is a side view of the drying apparatus of a fuel cell in the first embodiment.

FIG. 1 is a plan view of a drying apparatus 20 of a fuel cell 100 in a first embodiment. FIG. 2 is a side view of the drying apparatus 20 of the fuel cell 100 in the first embodiment. The drying apparatus 20 includes an air-blowing device 200 and a fuel cell-holding device 300 (hereinafter, referred to as "holding device 300"). The fuel cell 100 is mounted on the holding device 300 and thereby held by the holding device 300.

As shown in FIG. 2, the fuel cell includes an electrolyte membrane 110, a resin frame 120, and two separator plates 130, 140. The electrolyte membrane 110 is made of an ion exchange resin membrane having protonic conductivity, for example, a fluororesin-based ion exchange resin membrane having a sulfonic acid group ($-SO_3H$) as an ion exchange group. Both surfaces of the electrolyte membrane 110 are coated with catalyst layers 111, 112. Each of the catalyst layers 111, 112 has carbon that carries a catalyst (for example, platinum) and, for example, an ionomer having a sulfonic acid group. Gas diffusion layers 113, 114 are respectively disposed on the catalyst layers 111, 112. The gas diffusion layers 113, 114 are formed of carbon paper or carbon nonwoven fabric. The electrolyte membrane 110, the catalyst layers 111, 112, and the gas diffusion layers 113, 114 are also collectively referred to as a membrane electrode gas diffusion layer assembly MEGA. The resin frame 120 supports the electrolyte membrane 110 from the outer edge.

The separator plates 130, 140 are disposed so as to sandwich the membrane electrode gas diffusion layer assembly MEGA and the resin frame 120. The separator plate 130 includes six openings 131 to 136. Similarly, the separator plate 140 and the resin frame 120 also include six openings. However, in FIG. 2, solely two openings 131, 132, 141, 142, 121, 122 are shown in the separator plate 130, the separator plate 140, and the resin frame 120, respectively. The openings 131, 121, 141 communicate with each other to form a fuel gas supply manifold. The other openings also communicate with each other in the overlapping direction of the separator plate 130, the resin frame 120, and the separator plate 140 and form a fuel gas discharge manifold, an oxidant gas supply manifold, an oxidant gas discharge manifold, a coolant supply manifold, and a coolant discharge manifold.

The fuel cells 100 are sequentially stacked such that the separator plate 130 of one fuel cell and the separator plate 140 of another fuel cell 100 overlap each other, thereby forming a fuel cell stack. In the power generation inspection of the fuel cell stack, coolant is caused to flow through a coolant flow path formed by the separator plate 130 of each fuel cell 100 and the separator plate 140 of another fuel cell 100 adjacent to the fuel cell 100. Therefore, when the fuel cell stack is disassembled, and the fuel cell 100 is removed after the power generation inspection, water 400 is attached to the surfaces of the fuel cell 100, that is, the surfaces of the separator plates 130, 140 exposed on the opposite side from the membrane electrode gas diffusion layer assembly MEGA. A cooling medium other than the water 400, for example, a coolant for the fuel cell may be used for the cooling of the fuel cell 100. In this case, the cooling medium is attached to the surfaces of the separator plates 130, 140 on the opposite side from the membrane electrode gas diffusion layer assembly MEGA.

The holding device 300 includes a base 310 and mounting portions 320, 330, 340, 350. The base 310 has a substantially flat plate shape, and the mounting portions 320, 330, 340, 350 are provided on the base 310. The mounting portions 320, 330, 340, 350 have a columnar shape and have the same height. The mounting portions 320, 330, 340, 350 respectively have recesses 321, 331, 341, 351 in the top parts. The holding device 300 mounts the fuel cell 100 on the recesses 321, 331, 341, 351 of the mounting portions 320, 330, 340, 350 and thereby holds the fuel cell 100 at a predetermined angle with respect to the horizontal direction. In the example shown in FIGS. 1 and 2, the heights from the base 310 to the recesses 321, 331, 341, 351 are the same as each other. Therefore, the predetermined angle is 0°, and the surface of the fuel cell 100 that the air hits is not inclined with respect to the horizontal direction.

The air-blowing device 200 includes an air tank 210, a main stop valve 220, an air supply pipe 230, an air filter 240, a flow rate adjustment valve 250, an air blower 260, and nozzles 270. The air tank 210 is a tank that stores air to be blown to the fuel cell 100. As the air, nitrogen may be used. In addition, a compression pump may be used instead of the air tank 210. When the compression pump is used, the main stop valve 220 is not needed. The main stop valve 220 is a valve that opens and closes the air tank 210. The air supply pipe 230 connects the main stop valve 220 and the air blower 260. The air filter 240 and the flow rate adjustment valve 250 are provided on the air supply pipe 230. The air filter 240 removes dust in the air. The air filter 240 may not be provided. The flow rate adjustment valve 250 adjusts the flow rate of the air. The air blower 260 has a plurality of nozzles 270 and blows the air toward the fuel cell 100 through the nozzles 270. The nozzles 270 are arranged in a direction perpendicular to the blowing direction of the air. A site in the fuel cell 100 to which the air is blown is referred to as "air-blown site 280". The air-blown site 280 has a strip shape perpendicular to the blowing direction of the air. The inner diameter of the nozzle 270 is, for example, 2 mm to 3 mm, and the nozzles are provided at intervals of 10 mm. The air blower 260 may be configured to include, instead of the nozzles 270, holes having an inner diameter of 2 mm to 3 mm at intervals of 10 mm and to below the air toward the fuel cell 100 through the holes.

The lower limit of an angle θ1 formed between the blowing direction of the air when the air blown from the nozzles 270 hits the fuel cell 100 and the surface of the fuel cell 100 is 5° or larger. In addition, the upper limit is 85° or smaller. Since the angle θ1 is 5° or larger and 85° or smaller, the air obliquely hits the surface of the fuel cell 100, and the air does not enter the inside of the fuel cell 100 through the openings 121, 123. Therefore, it is possible to prevent the electrolyte membrane 110 and the like from being dried. In addition, the water 400 is blown off in one direction, leeward, and thus does not easily scatter. Therefore, the angle θ1 is preferably 5° or larger and more preferably 10° or larger. In addition, the angle θ1 is preferably 85° or smaller, more preferably 45° or smaller, and still more preferably 30° or smaller.

The wind velocity v1 of the air blown out from the nozzles 270 at the time of hitting the fuel cell 100 is preferably 5 m/s or higher and more preferably 10 m/s or higher. In addition, the wind velocity v1 of the air at the time of hitting the fuel cell 100 is preferably 30 m/s or lower and more preferably 20 m/s or lower. When the wind velocity v1 is in this range, it is possible to easily blow off the water 400 while the blown-off water 400 is prevented from scattering in a broad range. The wind velocity v1 may not be in the range of 5 m/s or higher and 30 m/s or lower.

The distance L1 that the air blown out from the nozzles 270 travels until hitting the fuel cell 100 is preferably 0.1 m or longer and more preferably 0.15 m or longer. In addition, the distance L1 is preferably 0.3 m or shorter and more preferably 0.25 m or shorter. When the distance L1 is 0.1 m or longer, the air appropriately spreads in the width direction, and the number of the nozzles 270 needed is small. The distance L1 may not be in the range of 0.1 m or longer and 0.3 m or shorter.

In the first embodiment, the air blower 260 and the nozzles 270 are moved at a velocity v2 in the blowing direction of the air without changing the distance from the fuel cell 100. This configuration enables the water 400 to be sequentially blown off in the blowing direction of the air. The velocity v2 is preferably 0.01 m/s or higher and more preferably 0.015 m/s or higher, and the velocity v2 is preferably 0.03 m/s or lower and more preferably 0.02 m/s or lower. When the velocity v2 is 0.01 m/s or higher and 0.03 m/s or lower, it is possible to blow off all the water 400 within a short period of time by moving the air blower and the nozzles solely once. The velocity v2 may not be in the range of 0.01 m/s or higher and 0.03 m/s or lower.

In the fuel cell 100, the water 400 is also attached to the surface of the separator plate 140. The water 400 on the surface of the separator plate 140 can be blown off in the same manner as the blowing-off of the water 400 on the surface of the separator plate 130 by turning over the fuel cell 100 and mounting the fuel cell on the holding device 300.

As described above, according to the first embodiment, since the holding device 300 that holds the fuel cell 100 at 0°, which is the angle predetermined with respect to the horizontal direction, and the air blower 260 that blows the air toward the fuel cell 100 at an angle in a range of 5° or larger and 85° or smaller with respect to the predetermined angle are provided, it is possible to blow off the water 400 attached to the fuel cell 100 while the air is prevented from hitting the electrolyte membrane 110. Therefore, it is possible to appropriately dry the fuel cell 100 while the electrolyte membrane is prevented from being affected by the air. In addition, since the fuel cell 100 is not heated or the like, the electrolyte membrane 110 is not affected by heat.

When the angle θ1 at which the air is blown toward the fuel cell 100 is in a range of 5° or larger and 45° or smaller with respect to the predetermined angle, it is possible to further facilitate the blowing-off of the water 400. When the angle θ1 is in a range of 10° or larger and 30° or smaller, it is possible to still further facilitate the blowing-off of the water 400.

Second Embodiment

Figure 3:
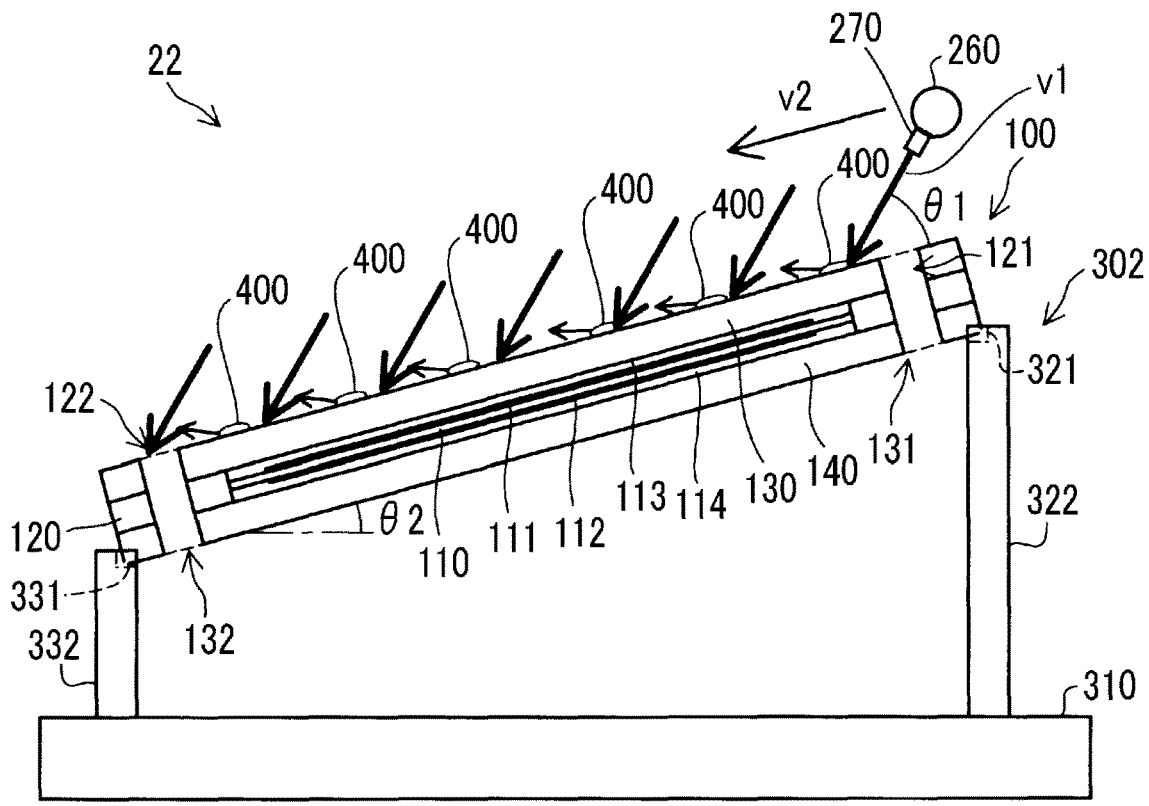
FIG. 3 is a side view of a drying apparatus of a fuel cell in a second embodiment.

FIG. 3 is a side view of a drying apparatus 22 of a fuel cell in a second embodiment. Hereinafter, differences from the drying apparatus 20 of the first embodiment will be described. The drying apparatus 22 of a fuel cell in the second embodiment differs from the drying apparatus 20 of the first embodiment in terms of the fact that the heights of mounting portions 322, 332, 342, 352 in a holding device 302 are different from the heights of the mounting portions 320, 330, 340, 350 in the holding device 300 of the first embodiment. That is, the heights of the mounting portions 320, 330, 340, 350 in the holding device 300 of the first embodiment are the same as each other. In contrast, in the holding device 302 of the second embodiment, the mounting portions 322, 342 have the same height, and the mounting portions 332, 352 have the same height, but the mounting portions 322, 342 are higher than the mounting portions 332, 352. Therefore, the fuel cell 100 mounted on the holding device 302 is inclined such that the fuel cell becomes higher on the mounting portions 322, 342 than on the mounting portions 332, 352. Therefore, the angle θ2 formed between the surface of the separator plate and the horizontal direction is an angle other than 0°. In FIG. 3, the mounting portions 342, 352 are hidden by the mounting portions 322, 332 and are thus not shown. The angle θ2 is preferably an angle of 5° or larger and 45° or smaller. When the angle θ2 is in this range, it is possible to use the force of gravity at the time of blowing off the water 400, and it is possible to easily hold the fuel cell by mounting the fuel cell 100 on the mounting portions 322, 332, 342, 352.

In addition, the air blower 260 is disposed on the higher side of the fuel cell 100, that is, on the mounting portion 322, 342 side of the fuel cell 100 and blows the air toward the mounting portions 332, 352. That is, the fuel cell 100 is inclined such that the portion of the fuel cell 100 where the air blower 260 that blows the air to the fuel cell 100 is present is higher than the remaining portion of the fuel cell 100.

In the drying apparatus 22, the parameters other than the angle θ2 are the same as those of the drying apparatus 20. For example, the angle θ1 at which the air blower 260 and the nozzles 270 blow the air toward the fuel cell 100 in the drying apparatus 22 is the same as the angle θ1 at which the air blower 260 and the nozzles 270 blow the air toward the fuel cell 100 in the drying apparatus 20. The description regarding the parameters is also true for the wind velocity v1 of the air blown out from the nozzles 270 at the time of hitting the fuel cell 100, the distance L1 that the air blown out from the nozzles 270 travels until hitting the fuel cell 100, and the velocity v2 of the movement of the air blower 260 and the nozzles 270.

As described above, according to the second embodiment, in addition to the effect of the first embodiment, since the air is blown toward the lower side of the fuel cell 100, it is possible to use the force of gravity at the time of blowing off the water 400 attached to the fuel cell 100.

Third Embodiment

Figure 4:
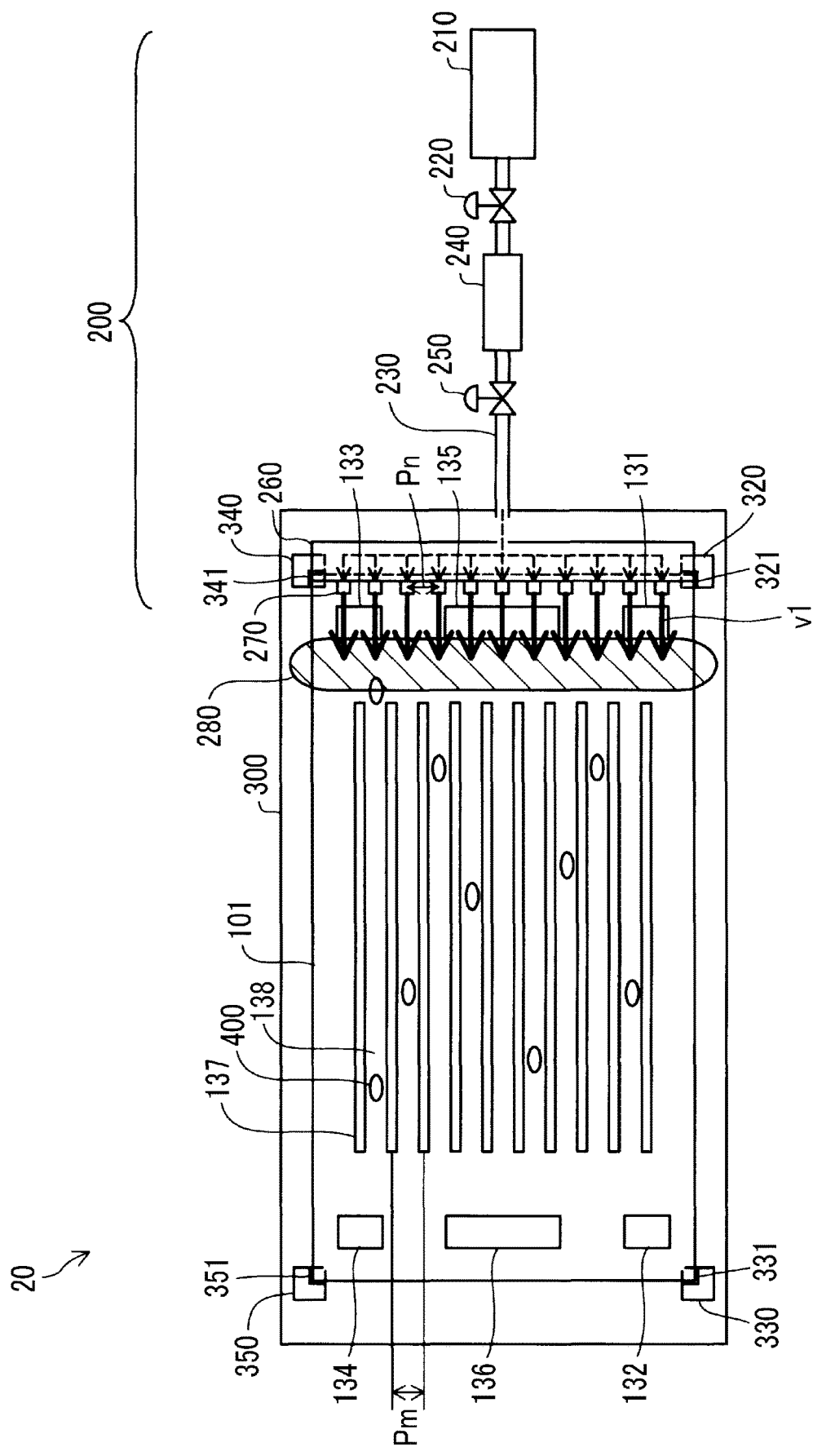
FIG. 4 is a plan view of a drying apparatus of a fuel cell in a third embodiment.

FIG. 4 is a plan view of a drying apparatus 20 of a fuel cell in a third embodiment. The difference between the third embodiment and the first embodiment is a fuel cell 101 that is mounted on the holding device 300. The fuel cell 101 includes protrusions 137 that protrude toward the opposite side of the separator plate from the electrolyte membrane 110 in order to cause the coolant to flow on the surface of the separator plate 130. The separator plate 130 has uneven coolant flow paths 138 on the surface. The description regarding the protrusions and the coolant flow paths is also true for the separator plate 140.

In the third embodiment, the fuel cell 101 is mounted on the holding device 300 such that the air that is blown from the air blower 260 and the nozzles 270 is blown to the fuel cell 101 along the coolant flow paths 138. When the fuel cell 101 is mounted on the holding device 300 as described above, in addition to the effect of the first embodiment, it is possible to blow off the water 400 attached to the fuel cell 101 along the coolant flow paths 138.

In the third embodiment, the pitches Pm between the protrusions 137 are preferably the same as the pitches Pn between the nozzles 270. In such a case, it is easy to blow off the water 400 attached to the recesses of the coolant flow paths 138.

In the third embodiment, similar to the second embodiment, the fuel cell 101 may be obliquely mounted on the holding device 302. In such a case, it is possible to use the force of gravity at the time of blowing off the water 400 attached to the fuel cell 101.

In the embodiment, the nozzles 270 are arranged in the direction perpendicular to the air blowing direction, but the nozzles may be two-dimensionally disposed in a direction parallel to the air blowing direction. In such a case, the air blower 260 does not need to be moved. In addition, when the nozzles are two-dimensionally disposed, the nozzles 270 that blow out the air may be sequentially operated in turn from the wind source side toward the wind target side in the air blowing direction.

In the embodiment, the temperature of the air is not described, but is preferably room temperature and may be in a range of room temperature±10° C. This is because, when the temperature is in the range of room temperature±10° C., the temperature does not affect the electrolyte membrane 110.

In the second embodiment, the holding device 302 obliquely holds the fuel cell 100, and the air blower 260 and the nozzles 270 blow the air downward to the surface of the separator plate 130. In the holding device 302, the fuel cell 100 may be obliquely disposed such that the blowing direction is upward, and the air blower 260 and the nozzles 270 may blow the air upward.

In the second embodiment, the holding device 302 holds the fuel cell 100 such that the front side of the fuel cell 100 in the blowing direction of the air is higher. The holding device 302 may obliquely hold the fuel cell 100 such that the right side or the left side with respect to the blowing direction of the air is higher.

The present disclosure is not limited to the embodiments and can be realized with a variety of configurations within the gist of the present disclosure. For example, the technical features of the embodiments that correspond to the technical features in each aspect described in the section of the SUMMARY can be appropriately replaced or combined in order to solve part or all of the problems or to achieve part or all of the effects. In addition, the technical features can be deleted as appropriate unless the technical features are described as indispensable in the present specification.

What is claimed is:

1. A drying method of a fuel cell comprising:
   holding the fuel cell having a separator plate exposed on a surface of the fuel cell at a predetermined angle; and
   blowing air to the fuel cell at an angle in a range of 5° or larger and 85° or smaller with respect to a surface of the separator plate of the fuel cell held at the predetermined angle.

2. The drying method of a fuel cell according to claim 1, wherein:
   the predetermined angle is an angle at which an angle formed between the surface of the separator plate and a horizontal direction is an angle other than 0°; and
   the fuel cell is inclined such that a portion of the fuel cell where an air blower that blows air to the fuel cell is present is higher than the remaining portion of the fuel cell.

3. The drying method of a fuel cell according to claim 2, wherein the predetermined angle is an angle at which the angle formed between the surface of the separator plate and the horizontal direction is 5° or larger and 45° or smaller.

4. The drying method of a fuel cell according to claim 1, wherein an angle at which the air is blown toward the fuel cell is an angle in a range of 5° or larger and 45° or smaller with respect to the predetermined angle.

5. The drying method of a fuel cell according to claim 1, wherein an angle at which the air is blown toward the fuel cell is an angle in a range of 10° or larger and 30° or smaller with respect to the predetermined angle.

6. The drying method of a fuel cell according to claim 1, wherein, in a situation where the fuel cell has an uneven coolant flow path on the surface of the separator plate that air hits, the air is blown to the separator plate of the fuel cell along the uneven coolant flow path.

\* \* \* \* \*